United States Patent
Spiegelberg et al.

(10) Patent No.: US 9,359,910 B2
(45) Date of Patent: Jun. 7, 2016

(54) METHOD AND APPARATUS FOR MEASURING OPERATIONAL GAS TURBINE ENGINE HOUSING DISPLACEMENT AND TEMPERATURE BY A DISTRIBUTED FIBER OPTIC SENSING SYSTEM UTILIZING OPTICAL FREQUENCY DOMAIN REFLECTOMETRY

(71) Applicant: SIEMENS ENERGY, INC., Orlando, FL (US)

(72) Inventors: Christine P. Spiegelberg, Winter Park, FL (US); Erwan Baleine, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 231 days.

(21) Appl. No.: 14/290,220

(22) Filed: May 29, 2014

(65) Prior Publication Data
US 2015/0345324 A1    Dec. 3, 2015

(51) Int. Cl.

| | |
|---|---|
| F01D 21/00 | (2006.01) |
| G01M 11/00 | (2006.01) |
| G01M 15/04 | (2006.01) |
| G01M 15/02 | (2006.01) |
| F01D 25/24 | (2006.01) |
| G01M 15/14 | (2006.01) |
| G01D 5/353 | (2006.01) |

(52) U.S. Cl.
CPC .............. *F01D 21/003* (2013.01); *F01D 25/24* (2013.01); *G01D 5/35354* (2013.01); *G01M 11/3172* (2013.01); *G01M 15/02* (2013.01); *G01M 15/042* (2013.01); *G01M 15/14* (2013.01)

(58) Field of Classification Search
None
See application file for complete search history.

(56) References Cited

U.S. PATENT DOCUMENTS

| | | | | |
|---|---|---|---|---|
| 6,492,636 | B1 * | 12/2002 | Chen .................. | G01B 11/16 250/227.14 |
| 6,853,934 | B2 * | 2/2005 | Nagamatsu ............ | H04Q 9/00 702/56 |
| 7,495,750 | B2 * | 2/2009 | Hwang ................. | G01B 11/18 356/32 |
| 2008/0002187 | A1 * | 1/2008 | Froggatt ........... | G01M 11/3172 356/73.1 |
| 2010/0074572 | A1 * | 3/2010 | Zheng .................... | F01D 17/02 385/13 |
| 2010/0134783 | A1 * | 6/2010 | Omichi ................. | G01B 11/18 356/33 |
| 2010/0141930 | A1 * | 6/2010 | Omichi ................. | G01B 11/18 356/33 |
| 2011/0109898 | A1 | 5/2011 | Froggatt et al. | |
| 2011/0205526 | A1 * | 8/2011 | Brown .................. | G01B 11/18 356/32 |
| 2013/0094798 | A1 * | 4/2013 | Duncan .............. | E21B 47/0006 385/13 |
| 2014/0218716 | A1 * | 8/2014 | Brown .................. | G01K 11/32 356/32 |

OTHER PUBLICATIONS

Luna: Fiber Optic Shape Sensing, Current State of Technology, Luna Innovations Incorporated, Jun. 21, 2013 (6 pages).

\* cited by examiner

*Primary Examiner* — Gordon J Stock, Jr.

(57) ABSTRACT

Operational gas turbine engine housing or casing dynamic strain, temporary or permanent displacement and/or temperature is measured by a distributed fiber optic sensing system (DFOSS) utilizing optical frequency domain reflectometry (OFDR) that is coupled to the turbine engine housing. The DFOSS/OFDR system measures localized variances in strain along the length of an optical fiber (OF), which are correlated with turbine engine housing displacement. Temperature influence on the measured localized strain variances is accounted for by obtaining temperature information from an another measurement system or by taking the same type OFDR measurements on unrestrained optical fiber (OF) and deriving compensated strain measurements that are not temperature influenced. The derived strain measurements along the DFOSS are correlated with housing displacement. Other embodiments include separate displacement measuring modules, each including DFOSS optical fibers, coupled along the engine housing.

20 Claims, 4 Drawing Sheets

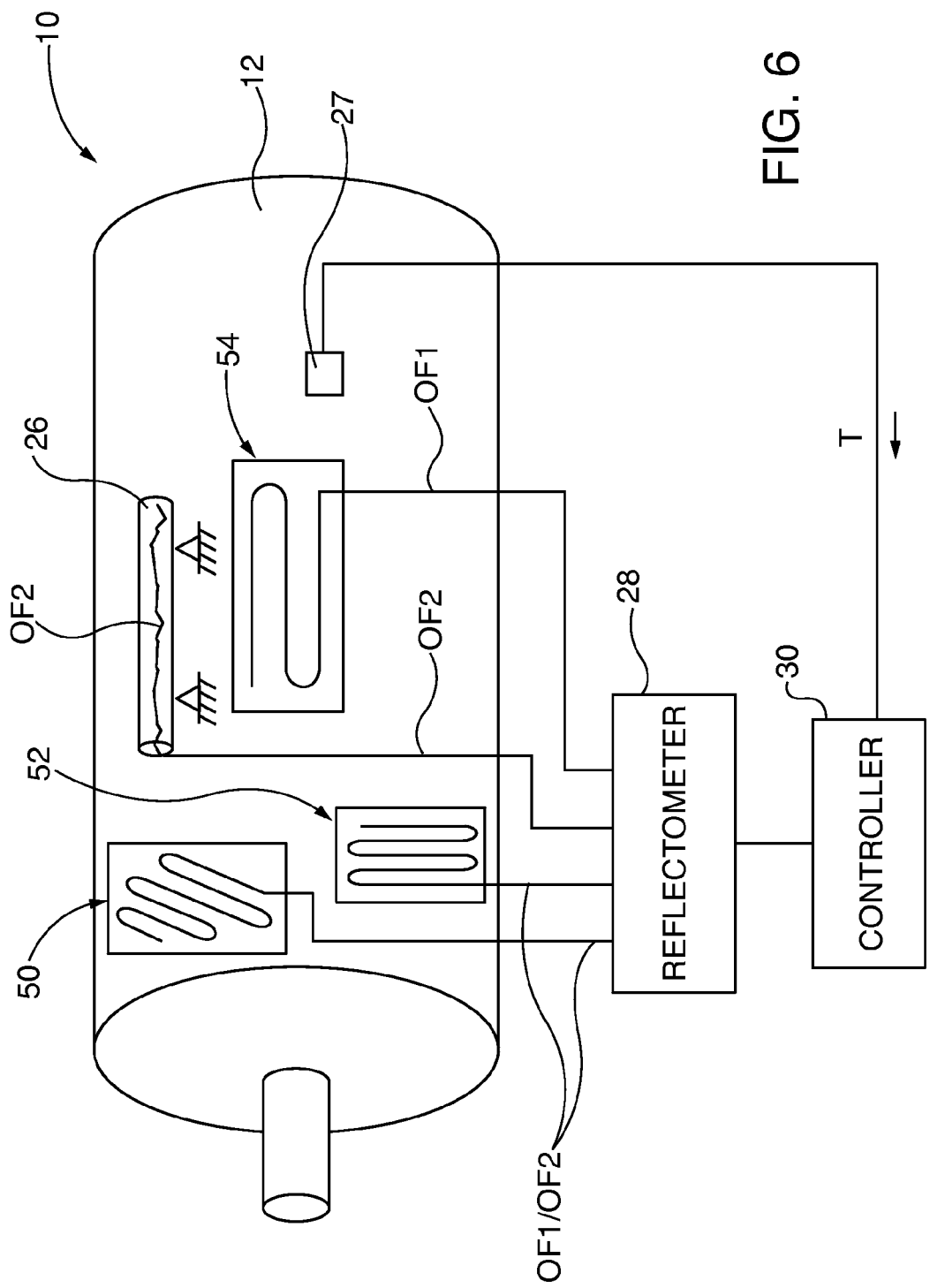

METHOD AND APPARATUS FOR MEASURING OPERATIONAL GAS TURBINE ENGINE HOUSING DISPLACEMENT AND TEMPERATURE BY A DISTRIBUTED FIBER OPTIC SENSING SYSTEM UTILIZING OPTICAL FREQUENCY DOMAIN REFLECTOMETRY

BACKGROUND OF THE INVENTION

1. Field of the Invention

The invention relates to measuring gas operational turbine engine housing or casing temporary or permanent displacement or flexure and temperature with a distributed fiber optic sensing system (DFOSS) that utilizes optical frequency domain reflectometry (OFDR).

2. Description of the Prior Art

Gas turbine engines are assembled and subsequently validated for conformance with operational specifications, including the engine housing or casing displacement during operation. Engine housing displacement measurement accuracy during validation is on the order of < or =0.25 mm axially, and < or =0.1 mm radially. Engine housing displacements are currently measured using costly and time consuming image correlation photogrammetric methods. Many photographs have to be taken from different angles and compared to each other in order to calculate 3-D shape changes that occur in gas turbine casings. Reflective targets are typically placed on and around the casing and images of the casing are taken from many different positions. Each target is captured in multiple images and there are many targets in each image. The images are assembled using an image assembly computer program uses trigonometric formulas to tie all the images together and determine the locations of all the targets relative to each other. Often the photographs are taken manually and frequently over the whole course of a validation period (several months) by several photographers and technicians. In addition, because the turbine casing is almost always covered with thermal isolation mats that are removed before the photography sessions, the accuracy of such photogrammetric measurement campaigns with respect to actual operational temperature influenced casing displacement is limited. Photogrammetry can only measure displacement and does not provide information about casing strain or temperature during real world engine operation.

Known optical frequency domain reflectometry (OFDR) systems 8, such as shown in FIG. 1, based on Rayleigh scattering in optical fiber OF are capable of measuring with a reflectometer 9 the strain (c), temperature (T), and to some degree even the shape of an optical fiber OF or the component to which the fiber is attached. OFDR is a distributed measurement that results in measured information over the whole length of an optical fiber, which can be from several meters to several hundred meters long. Millimeter spatial resolution, high dynamic range, strain resolution of less than +/−1 microstrain, and temperature resolution of 0.1° C. can be achieved with today's technology. The Rayleigh scatter profile of a fiber OF is the result of reflection from random but static index variations that are inherent to any optical fiber. Thermal and mechanical effects on the fiber induce a frequency shift of the backscattered light that is proportional to the applied strain or temperature because fiber length varies with either application of strain or heat or both. Distance or spatial information can be encoded a frequency modulation-based measurement system. More particularly, as shown in FIG. 2, distance information is encoded in the frequency domain. In FMCW (Frequency Modulated Continuous Wave) ranging, the outgoing laser transmission is frequency modulated and the frequency difference between the reflected wave and the local oscillator wave is measured. From the measured frequency difference, also called the beat frequency, it is possible to determine the distance to the reflector. Commercially available OFDR/FMCW reflectometers and optical fibers (OF) can be obtained from Luna Innovations Incorporated of Blacksburg, Va., USA. However, if the known OFDR strain/temperature measurement systems and methods are applied to relatively hot gas turbine engine casing environments the known OFDR system output does not separate strain (e.g., turbine housing/case flexure influences) from the operational changes in temperature that cause change in optical fiber elongation.

SUMMARY OF THE INVENTION

Accordingly, a suggested object of embodiments of the invention is to measure operational turbine engine housing or casing temporary or permanent displacement or flexure, such as for engine validation.

Another suggested object of embodiments of the invention is to measure operational turbine engine housing or casing temporary or permanent displacement or flexure selectively during engine service operation.

An additional suggested object of embodiments of the invention is to monitor operational turbine engine housing or casing temperature during engine validation and/or selectively during engine service operation.

These and other objects are achieved in one or more embodiments of the invention by a distributed fiber optic sensing system (DFOSS) utilizing optical frequency domain reflectometry (OFDR) that is coupled to the turbine engine housing. The DFOSS/OFDR system measures localized variances in strain along the length of an optical fiber (OF) are correlated with turbine engine housing displacement. Temperature influence on the measured localized strain variances is accounted for by obtaining temperature measurements from a temperature sensor coupled to the housing and deriving compensated strain measurements that are not temperature influenced. In exemplary embodiments the temperature measurements are obtained by taking the same type OFDR measurements on unrestrained optical fiber (OF) and deriving compensated strain measurements that are not temperature influenced. The derived strain measurements along the DFOSS are correlated with housing displacement. Thus the fiber optic sensing system during operation is capable of providing one or more of real time, online operational engine housing/casing dynamic strain, displacement and temperature. This displacement and/or temperature information can be utilized for engine validation or for selective ongoing monitoring of operational engines during their service life.

Exemplary embodiments of the invention feature a method for measuring operational gas turbine engine housing displacement by coupling a distributed fiber optic sensing system (DFOSS) to the housing and measuring optical fiber (OF) temperature influenced strain along the length of the OF by optical frequency domain reflectometry (OFDR) during engine operation. A temperature sensor is coupled to the gas turbine housing and temperature measurements are obtained during engine operation. Temperature influence from the DFOSS temperature influenced strain measurements is separated with the temperature sensor's temperature measurements in order to derive compensated strain measurements. An exemplary embodiment of a temperature sensor is an unrestrained second OF (not influenced by housing displacement strain) that is coupled to the gas turbine engine housing and its temperature along the length of the OF is measured by OFDR during engine operation. Then in this exemplary embodiment temperature influence from the DFOSS temperature influenced strain measurements is separated with the second OF temperature measurements in order to derive compensated strain measurements. The derived strain measurements along the DFOSS are correlated with housing displacement of the gas turbine engine.

Other exemplary embodiments of the invention feature an operational gas turbine engine housing displacement measurement system, comprising a distributed fiber optic sensing system (DFOSS) adapted for coupling to a gas turbine engine housing and for measuring optical fiber (OF) temperature influenced strain along the length of the OF by optical frequency domain reflectometry (OFDR) during engine operation. An unrestrained second OF is coupled to the gas turbine engine housing, for measuring OF temperature along the length of the OF by OFDR during engine operation. A controller is coupled to the DFOSS and the unrestrained second OF, for separating temperature influence from the DFOSS temperature influenced strain measurements with the second OF temperature measurements and deriving compensated strain measurements. The controller correlates the derived strain measurements along the DFOSS with turbine engine housing displacement.

Additional embodiments of the invention feature a gas turbine engine, comprising a gas turbine engine housing; and a gas turbine engine housing displacement measurement system, described above, that comprises a distributed fiber optic sensing system (DFOSS), which is coupled to the housing and for measuring optical fiber (OF) temperature influenced strain along the length of the OF by optical frequency domain reflectometry (OFDR) during engine operation. An unrestrained second OF is coupled to the gas turbine engine housing, for measuring OF temperature along the length of the OF by OFDR during engine operation. A controller is coupled to the DFOSS and the unrestrained second OF, for separating temperature influence from the DFOSS temperature influenced strain measurements with the second OF temperature measurements and deriving compensated strain measurements. The controller correlates the derived strain measurements along the DFOSS with turbine engine housing displacement.

The respective objects and features of the present invention may be applied jointly or severally in any combination or sub-combination by those skilled in the art.

BRIEF DESCRIPTION OF THE DRAWINGS

The teachings of exemplary embodiments of the invention can be readily understood by considering the following detailed description in conjunction with the accompanying drawings, in which:

FIG. 6 is a schematic view of another exemplary embodiment of an optical frequency domain reflectometry (OFDR) based operational gas turbine engine housing or casing deflection and temperature measurement system that incorporates a plurality of types of displacement and temperature measurement modules, wherein spatial orientation and/or pattern density of optical fibers in the DFOSS in any module is selectively varied across the turbine engine housing.

To facilitate understanding, identical reference numerals have been used, where possible, to designate identical elements that are common to the figures.

DETAILED DESCRIPTION

After considering the following description, those skilled in the art will realize that the teachings of embodiments of the invention can be readily utilized in operational gas turbine engine housing or casing dynamic strain, temperature and/or temporary or permanent displacement measurement systems. The housing displacement is measured by a distributed fiber optic sensing system (DFOSS) utilizing optical frequency domain reflectometry (OFDR) that is coupled to the turbine engine housing. The DFOSS/OFDR system measures localized variances in strain along the length of an optical fiber (OF), which are correlated with turbine engine housing displacement. Temperature influence on the measured localized strain variances is accounted for by obtaining temperature information from an another measurement system or by taking the same type OFDR measurements on an unrestrained OF (i.e., an OF that is not influenced by or isolated from housing displacement strain) that is coupled to the housing and deriving compensated strain measurements that are not temperature influenced. Temperature measured by the second, unrestrained OF can also be utilized to derive engine housing temperature. The derived strain measurements along the DFOSS are correlated with housing displacement. Other embodiments include separate displacement measuring modules, each including DFOSS optical fibers, coupled along the engine housing.

Figure 1:
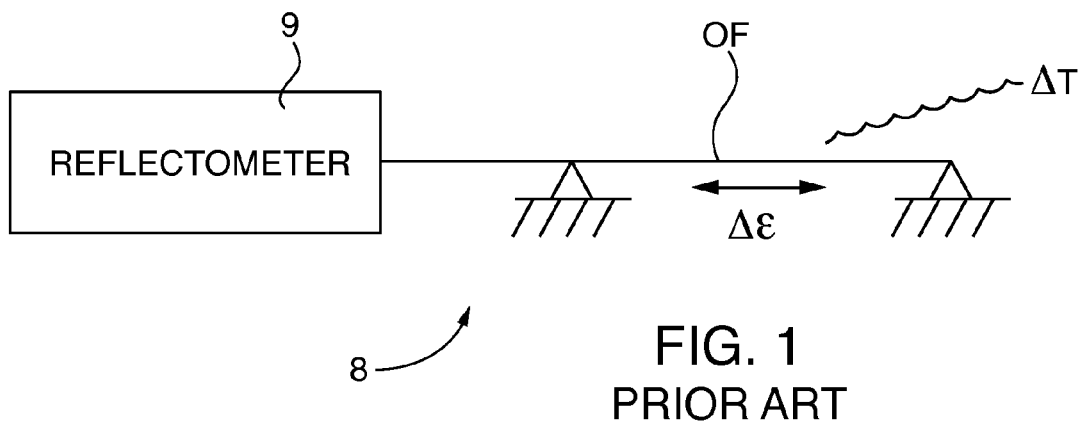
FIG. 1 is a schematic view of a known optical frequency domain reflectometry (OFDR) system that measures temperature influenced strain on an optical fiber.
Figure 2:
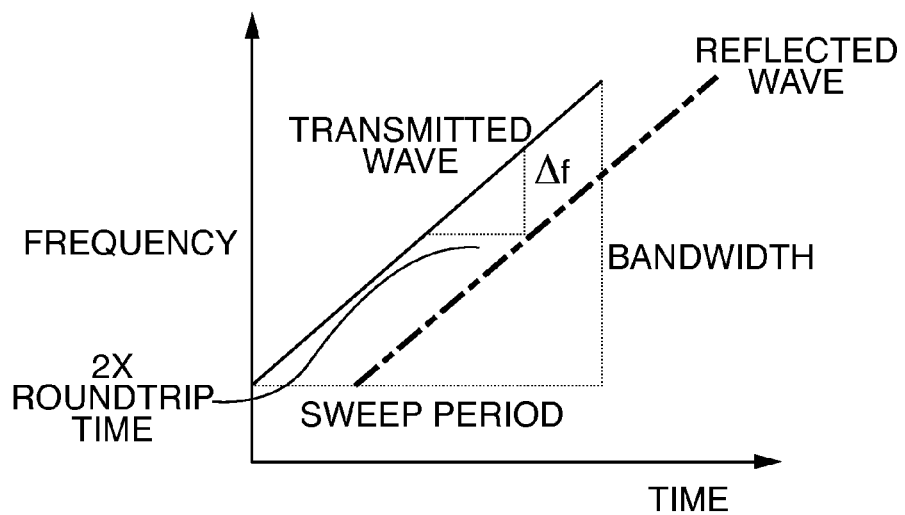
FIG. 2 is a frequency/time graph showing correlation of frequency shift (Δf) and change in optical fiber (OF) length (strain), assuming constant temperature.
Figure 3:
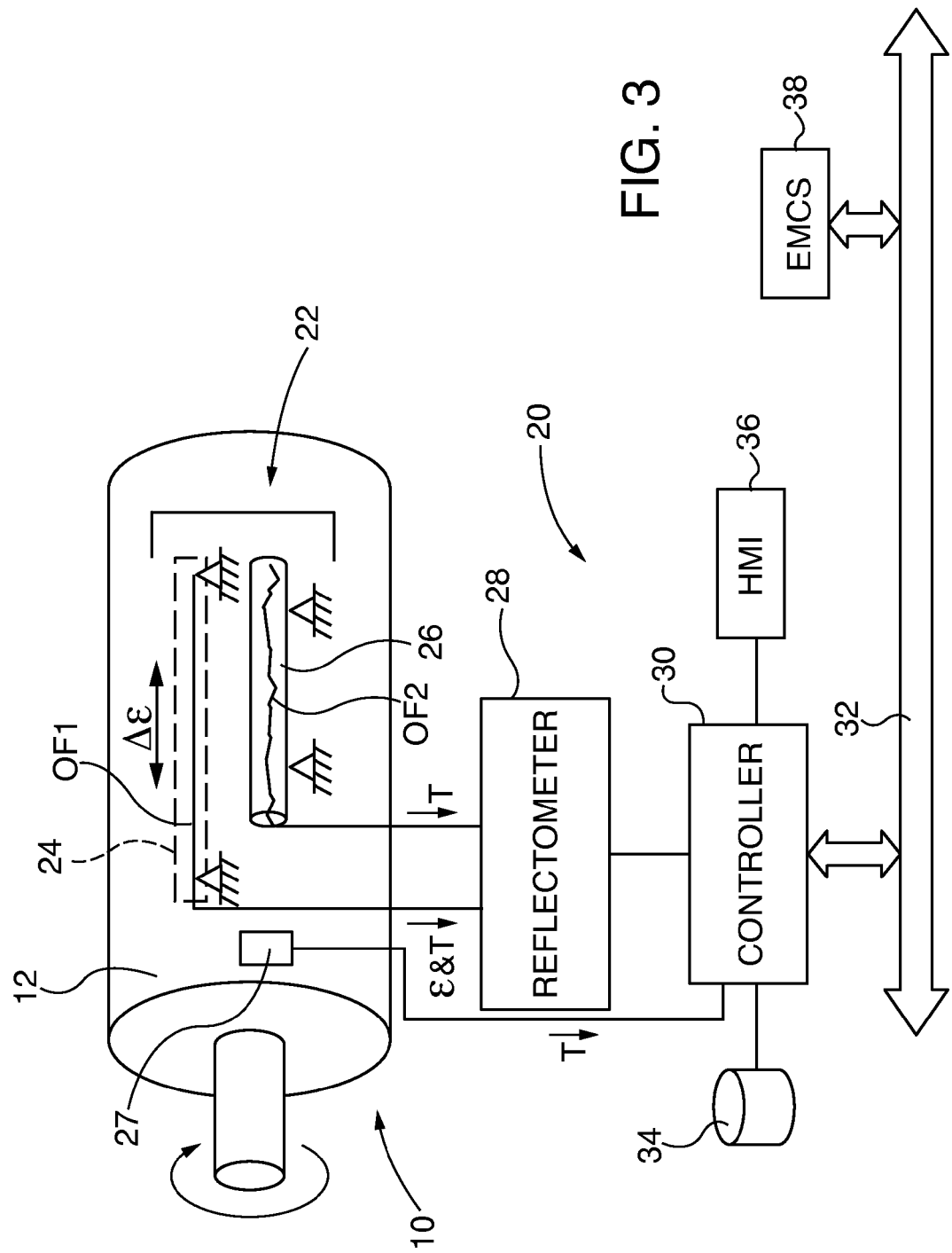
FIG. 3 is a schematic view of an exemplary embodiment of an optical frequency domain reflectometry (OFDR) based operational gas turbine engine housing or casing deflection and temperature measurement system.

FIG. 3 shows an operational gas turbine engine 10, with a housing or casing 12, to which is affixed an exemplary embodiment of a housing displacement/temperature measurement system 20 of the invention. The measurement system 20 incorporates a distributed fiber optic sensing system (DFOSS) 22 comprising an elongated optical fiber OF1 that is coupled to the engine housing 12 in a fixed manner, such as by application of an adhesive (e.g., epoxy) 24, so that the fiber expands and contracts with housing displacement or temperature. The DFOSS 22 may comprise more than one optical fiber strands in any array pattern on the engine housing 12. For simplicity of the description only a single fiber OF1 is shown.

An unrestrained second fiber OF2 that is not subject to strain influences is housed in a conduit 26. However, the second fiber's OF2 Raleigh scattering optical properties are subject to temperature influence (T) from the surrounding gas turbine 10. Thus temperature measurements along the second fiber OF2 are available for engine monitoring functions as well as to negate or separate temperature influences on the temperature/strain Raleigh scattering properties of the first fiber OF1. Preferably the array paths of the OF1 and OF2 fibers are proximal each other for accurate localized correlation of the frequency shifts in each. The array path of the OF2 fiber may be chosen to provide any desired lesser acceptable localized correlation of the respective fibers frequency shifts.

The OFDR measurement method works with any optical fiber and for this application in combustion gas turbine housing/casing environments is mainly limited by the temperature resistivity of the chose fiber and its protective fiber coating. For temperatures up to approximately 300-350° C. polyimide fiber coating is available. For higher temperatures up to approximately 600° C., metal (for example aluminum or gold) coatings or claddings are available. Typically, gas turbine housing 12 temperatures range between 80-250° C., depending on the location on the engine. Distributed fiber optic temperature and strain sensing in the turbine engine 10 housing 12 region can therefore be considered a realistic approach that would result in very valuable strain, temperature, and dislocation information that is not available with other methods. Optical fiber is very thin and can be applied under the engine insulation and can be attached using a variety of methods, for instance using high temperature epoxy. Another advantage of fiber optic strain measurements over traditional strain gauges is the largely extended dynamic range of the measurement. Optical fiber can be stretched safely to a point where regular strain gauges typically fail.

The OF1 and OF2 fibers are coupled to a known commercially available OFDR reflectometer 28, which includes a pulsed laser transmitter and a receiver interrogator. The known reflectometer 28 may desirably utilize a known frequency modulated continuous wave (FMCW) ranging method to determine accurately strain and temperature influences on the interrogated fibers' elongation. With respect to the OF1 fiber, the OFDR/FMCW reflectometer 28 derives temperature influenced strain along the localized fiber length. The reflectometer 28 derives temperature readings along the localized fiber length of OF2 utilizing the same methodologies as used for the OF1 fiber, but there are no strain influences on the isolated, unrestrained OF2 fiber. If a known commercial multi-core helically oriented fiber optic cable of the type available from Luna Innovations Incorporated is utilized in practicing the present invention localized changes in the cable's strain among the respective fibers along their length can be correlated with the cable's gross shape and thus the gross turbine engine's 10 housing 12 shape. Then changes in the housing 12 shape during engine 10 operation can be correlated with housing displacement/flexure.

A controller 30 is coupled to the reflectometer 28 and receives the OF1 temperature influenced localized strain readings and the OF2 temperature readings. The controller separates temperature influence from the DFOSS OF1 fiber's temperature-strain readings using the temperature influenced only readings from the OF2 fiber or temperature measurements obtained from another type of temperature sensor 27, thereby deriving compensated "strain only" strain measurements. The controller 30 then correlates the derived strain measurements along the DFOSS OF1 fiber(s) with housing 12 displacement of the gas turbine engine 10. The derived strain only, temperature (from the OF2 or any other temperature sensor 27) and housing displacement measurements are also available for use by other engine 10 monitoring and control functions by communicating them via a communications pathway (see, e.g., data bus 32) to an engine monitoring and control system (EMCS) 38. Alternatively or additionally the controller 30 can store or display the derived strain only, temperature and housing displacement measurements in a known data storage unit 34 or a human machine interface 36, for subsequent processing or for human operator intervention. While the reflectometer 28 and the controller 30 are shown as different physical devices in FIG. 3, their hardware and operation functions may be combined in a single device or they may in turn be incorporated into another functional device, such as in the engine monitoring and control system 38 or at a remote monitoring site run by a turbine engine service provider. In an alternative mobile inspection application, the reflectometer 28 and controller 30 can be selectively connected and disconnected from multiple turbine engines distributed fiber optic sensing systems, for validation and subsequent periodic inspection by service personnel.

Figure 4:
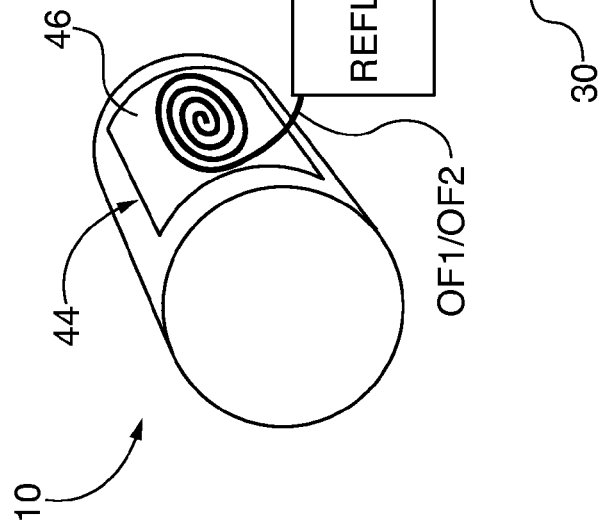
FIG. 4 is a schematic view of an exemplary embodiment of a displacement and temperature measurement module wherein the distributed fiber optic sensing system (DFOSS) fibers are arrayed in a zig-zag pattern.
Figure 5:
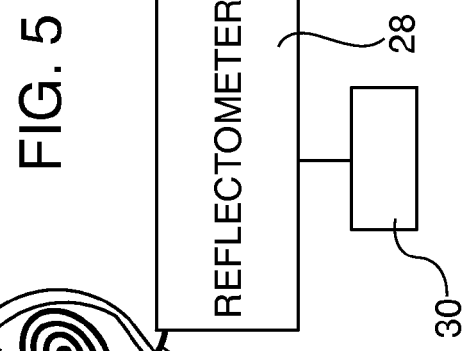
FIG. 5 is a schematic view of another exemplary embodiment of a displacement and temperature measurement module wherein the distributed fiber optic sensing system (DFOSS) fibers are arrayed in a spiral or circular pattern.

To measure large displacements of several millimeters or centimeters over a large area, with the necessary previously described validation resolutions of < or =0.25 mm axially, and < or =0.1 mm radially, separate displacement measurement modules (DMM), each including at least DFOSS OF1 optical fibers, are arrayed along the turbine housing, such as shown in FIGS. 4-6. For greater accuracy strain and displacement measurement accuracy the DMM may include one or more temperature measurement only unrestrained OF2 fiber(s). In a DMM construction a fiber patch is covered with an array of optical fibers that may have varying spatial orientation and/or pattern density to suit different monitored locations across the turbine engine housing 12. In the embodiment of FIG. 4, the DMM 40 has a fiber patch 42 to which is coupled a zig-zag array of combined OF1 and OF2 optical fibers, that are in turn coupled to the reflectometer 28 and controller 30. In the embodiment of FIG. 5, the DMM 44 has a fiber patch 46 to which is coupled a spiral array of combined OF1 and OF2 optical fibers, that are in turn coupled to the reflectometer 28 and controller 30. In the embodiment of FIG. 6, separate DMMs 50, 52 and 54 comprise a composite distributed fiber optic sensing system (DFOSS), each with different OF1 or OF1/OF2 fibers arrayed in different orientations and pattern densities along the turbine engine 10 housing 12. In order to obtain temperature measurements for the DMMs 54 that do not have their own dedicated temperature-only measurement sensors, the temperature information can be obtained from any of the temperature sensor(s) 27, a stand-alone temperature only monitoring fiber OF2 and its conduit 26 or the dedicated temperature-only measurement sensor contained in another DMM 50 or 52, that are mounted on the engine housing 12.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including" "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for measuring operational gas turbine engine housing displacement/temperature, comprising:
   coupling a distributed fiber optic sensing system (DFOSS) to a gas turbine engine housing and measuring optical fiber (OF) temperature influenced strain along the length of the OF by optical frequency domain reflectometry (OFDR) during engine operation;

coupling a temperature sensor to the gas turbine housing and measuring temperature during engine operation;

separating temperature influence from the DFOSS temperature influenced strain measurements with the temperature sensor temperature measurements and deriving compensated strain measurements; and correlating the derived strain measurements along the DFOSS with housing displacement of the gas turbine engine.

2. The method of claim 1, the temperature sensor comprising an unrestrained second OF that is coupled to the gas turbine engine housing and measuring OF temperature along the length of the OF by OFDR.

3. The method of claim 1, the OFDR comprising frequency modulated continuous wave (FMCW) ranging.

4. The method of claim 3, comprising:

coupling separate displacement measurement modules, each including optical fibers of a DFOSS along the turbine engine housing;

deriving compensated strain measurements for each module; and correlating each module's compensated strain measurement with turbine engine housing displacement.

5. The method of claim 4, each module further comprising a temperature sensor having an unrestrained second OF that is coupled to the gas turbine engine housing and measuring OF temperature along the length of the OF by OFDR.

6. The method of claim 4, spatial orientation and/or pattern density of optical fibers in the DFOSS in any module selectively varied across the turbine engine housing.

7. The method of claim 1, comprising:

coupling separate displacement measurement modules, each including optical fibers of a DFOSS along the turbine engine housing;

deriving compensated strain measurements for each module; and correlating each module's compensated strain measurement with turbine engine housing displacement.

8. The method of claim 7, each module further comprising a second OF.

9. An operational gas turbine engine housing displacement/temperature measurement system, comprising:

a distributed fiber optic sensing system (DFOSS) adapted for coupling to a gas turbine engine housing and for measuring optical fiber (OF) temperature influenced strain along the length of the OF by optical frequency domain reflectometry (OFDR) during engine operation;

an unrestrained second OF coupled to the gas turbine engine housing, for measuring OF temperature along the length of the OF by OFDR during engine operation;

a controller coupled to the DFOSS and the unrestrained second OF, for separating temperature influence from the FDFOSS temperature influenced strain measurements with the second OF temperature measurements and deriving compensated strain measurements; and the controller correlating the derived strain measurements along the DFOSS with turbine engine housing displacement.

10. The system of claim 9, the DFOSS optical fibers directly coupled to the turbine engine housing with an adhesive composition.

11. The system of claim 9, the OFDR comprising a frequency modulated continuous wave (FMCW) ranging system.

12. The system of claim 11, further comprising:

separate displacement measurement modules, each including optical fibers of a DFOSS, for coupling along the turbine engine housing;

the controller deriving compensated strain measurements for each module; and the controller correlating each module's compensated strain measurement with turbine engine housing displacement.

13. The system of claim 12, each module further comprising a second OF.

14. The system of claim 12, spatial orientation and/or pattern density of optical fibers in the DFOSS in any module selectively varied across the turbine engine housing.

15. The system of claim 9, further comprising:

separate displacement measurement modules, each including optical fibers of a DFOSS, for coupling along the turbine engine housing;

the controller deriving compensated strain measurements for each module; and the controller correlating each module's compensated strain measurement with turbine engine housing displacement.

16. The system of claim 15, each module further comprising a second OF.

17. The system of claim 9, spatial orientation and/or pattern density of optical fibers in the DFOSS in any module selectively varied across the turbine engine housing.

18. A gas turbine engine, comprising:

a gas turbine engine housing; and a gas turbine engine housing displacement/temperature measurement system, comprising:

a distributed fiber optic sensing system (DFOSS) coupled to the gas turbine engine housing and for measuring optical fiber (OF) temperature influenced strain along the length of the OF by optical frequency domain reflectometry (OFDR) during engine operation;

an unrestrained second OF coupled to the gas turbine housing, for measuring OF temperature along the length of the OF by OFDR during engine operation;

a controller coupled to the DFOSS and the unrestrained second OF, for separating temperature influence from the DFOSS temperature influenced strain measurements with the second OF temperature measurements and deriving compensated strain measurements; and the controller correlating the derived strain measurements along the DFOSS with turbine engine housing displacement.

19. The engine of claim 18, the OFDR comprising a frequency modulated continuous wave (FMCW) ranging system.

20. The engine of claim 19, further comprising:

separate displacement measurement modules, each including optical fibers of a DFOSS, for coupling along the turbine engine housing;

the controller deriving compensated strain measurements for each module; and the controller correlating each module's compensated strain measurement with turbine engine housing displacement.

* * * * *